United States Patent
Stavely (10) Patent No.: US 7,212,230 B2
(45) Date of Patent: May 1, 2007

(54) DIGITAL CAMERA HAVING A MOTION TRACKING SUBSYSTEM RESPONSIVE TO INPUT CONTROL FOR TRACKING MOTION OF THE DIGITAL CAMERA

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 10/339,132

(22) Filed: Jan. 8, 2003

(65) Prior Publication Data

US 2004/0130628 A1   Jul. 8, 2004

(51) Int. Cl.
*H04N 5/228* (2006.01)

(52) U.S. Cl. .............................. 348/208.1; 348/208.16; 348/208.4

(58) Field of Classification Search ........... 348/208.16, 348/208.1, 208.12, 208.2, 208.99; 396/52, 396/53, 54

See application file for complete search history.

(56) References Cited

U.S. PATENT DOCUMENTS

| | | | |
|---|---|---|---|
| 5,307,113 A | | 4/1994 | Egawa |
| 5,402,197 A | * | 3/1995 | Okano et al. ............... 396/55 |
| 5,708,063 A | * | 1/1998 | Imura et al. ............... 524/84 |
| 5,790,490 A | * | 8/1998 | Satoh et al. ............... 396/52 |
| 6,480,629 B1 | | 11/2002 | Bakhmutsky |
| 6,487,369 B1 | * | 11/2002 | Sato ........................ 396/52 |
| 2003/0151672 A1 | * | 8/2003 | Robins et al. ........... 348/208.6 |

OTHER PUBLICATIONS

Pending U.S. Appl. No. 09/997,675, filed Nov 28, 2001, "Camera That Operates In Accordance Wtih The Speed Requirements Of The Photographer," Mark N. Robins et al. 10015526-1.

* cited by examiner

*Primary Examiner*—Ngoc-Yen Vu (57) ABSTRACT

A digital camera delays the capture of a digital image after image capture has been requested until the motion of the digital camera satisfies a motion criterion. The digital camera thereby reduces image blur that would otherwise occur due to camera motion.

16 Claims, 6 Drawing Sheets

DIGITAL CAMERA HAVING A MOTION TRACKING SUBSYSTEM RESPONSIVE TO INPUT CONTROL FOR TRACKING MOTION OF THE DIGITAL CAMERA

FIELD OF THE INVENTION

The present invention relates generally to digital photography and more specifically to apparatuses and techniques for reducing image blur in a camera.

BACKGROUND OF THE INVENTION

A pervasive problem in photography is blur due to camera motion. Some film cameras and other optical devices such as binoculars include highly sophisticated active image stabilization systems that deflect the image path slightly in a direction opposite of the camera motion. Such active stabilization systems are, however, both complex and expensive.

One alternative is to use a faster lens. Digital cameras already use the fastest lens practical in terms of cost, size, and desired image quality. Lenses with maximum apertures of f/2 to f/2.8 are typical. Still faster lenses are much more expensive and bulky.

It is thus apparent that there is a need in the art for a digital camera that reduces image blur without recourse to expensive or otherwise impractical solutions.

SUMMARY OF THE INVENTION

A method for reducing image blur in a digital camera by the tracking of camera motion is provided. An apparatus for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Camera motion or "shake" tends to be somewhat periodic in both the horizontal and vertical directions. At instants of direction reversal, the camera is nearly stationary, just as a child's swing is momentarily stationary at the instant it reaches the full extent of its travel in either direction. Image blur in a digital camera may therefore be reduced by delaying capture of a digital image, after actuation of the shutter release button, until the motion of the digital camera satisfies a motion criterion. For example, image capture may be delayed until camera motion reaches one of those instants of minimal motion (a local minimum). To avoid an unacceptable lag following actuation of the shutter release button, the delay may be constrained not to exceed a predetermined timeout period, or other criteria may be used to capture a digital image despite the motion criterion not being satisfied. Implementation of this technique requires some method for measuring the motion of the digital camera in approximately real time. Motion estimation algorithms may be relatively simple or quite complex. One example of sophisticated motion estimation well known in the video encoding art is that implemented in connection with the Moving Pictures Expert Group (MPEG) video compression standards.

Figure 1A:
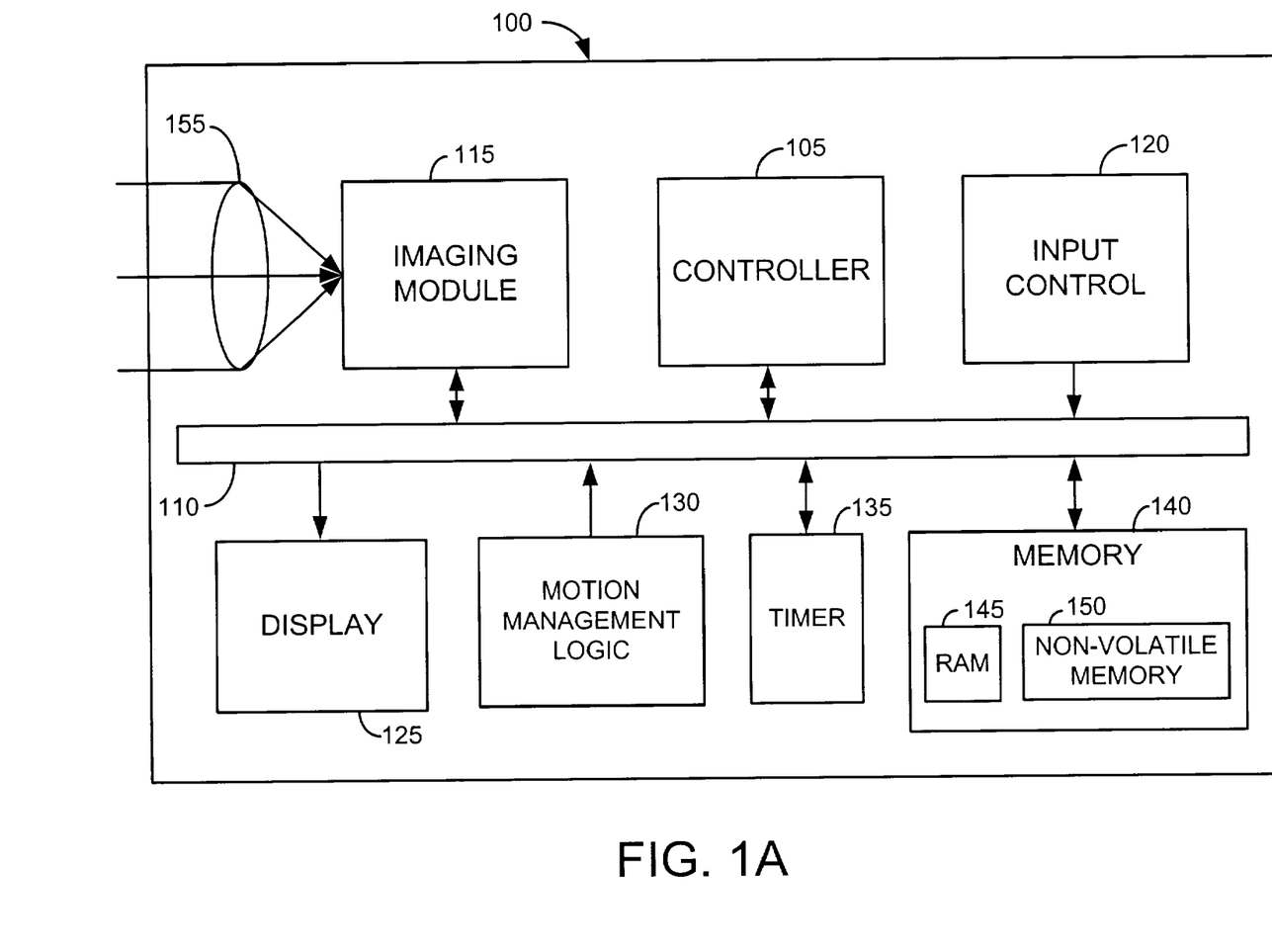
FIG. 1A is a functional block diagram of a digital camera in accordance with an illustrative embodiment of the invention.

FIG. 1A is a block diagram of a digital camera 100 in accordance with an illustrative embodiment of the invention. In FIG. 1A, controller 105 communicates over data bus 110 with imaging module 115, input control 120, display 125, motion management logic 130, timer 135, and memory 140. Memory 140 further comprises random-access memory (RAM) 145 and non-volatile memory 150. Optical system 155 produces optical images that are converted to digital images by imaging module 115. Optical system 155 may comprise, for example, a zoom lens. Imaging module 115 may comprise an array of photosensors based on charge-coupled-device (CCD) or CMOS technology, an analog-to-digital converter (A/D), a gain control, and a digital signal processor (DSP) (not shown in FIG. 1A). Imaging module 115 may be operated in a video preview mode in which digital preview frames are acquired at a rate of, for example, 30 frames per second and shown on display 125. Digital camera 100 may operate in this video preview mode while operations such as autofocus, autoexposure, and motion tracking are performed. A CMOS photosensor array has the advantage that pixels can be addressed directly like RAM, which simplifies and speeds the readout of the image data for these operations.

Figure 1B:
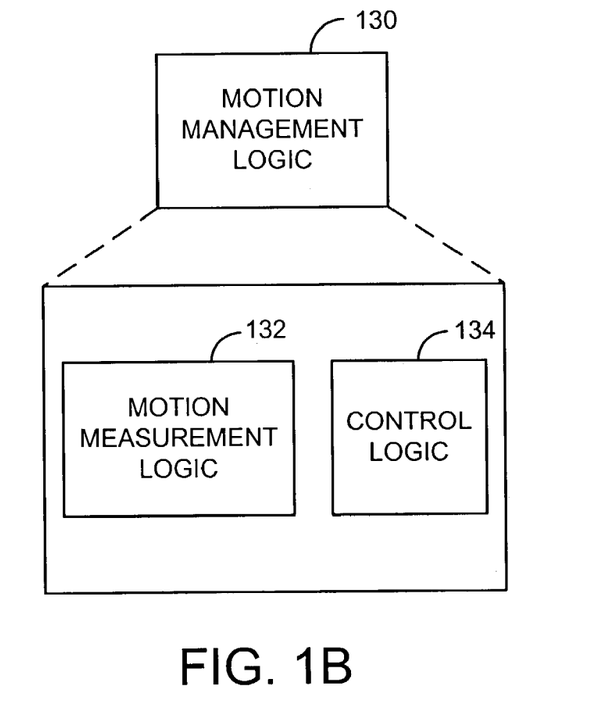
FIG. 1B is a conceptual diagram of the motion management logic shown in FIG. 1A in accordance with an illustrative embodiment of the invention.

Motion management logic 130 may comprise hardware, firmware, software, or a combination thereof. Motion management logic 130 may be conceptualized as having two aspects: motion measurement logic 132 and control logic 134, as shown in FIG. 1B. Motion measurement logic 132 performs motion estimation on digital preview frames obtained from imaging module 115 during video preview mode. These digital preview frames may be of a lower resolution than a final digital image to facilitate video preview mode. Control logic 134 analyzes motion estimation information obtained from motion measurement logic 132 to determine when a digital image should be captured after capture of an image has been requested. In one illustrative embodiment, controller 105 comprises a microprocessor, and motion management logic 130 comprises stored program instructions in software or firmware or a combination thereof that may be executed by controller 105. In such an illustrative embodiment, the combination of controller 105, imaging module 115, and motion measurement logic 132 may be termed, functionally, a motion tracking subsystem that outputs an indication of the motion of digital camera 100 as a function of time. Controller 105, in accordance with control logic 134, selects the instant of image capture based on the output of the motion tracking subsystem.

Figure 1C:
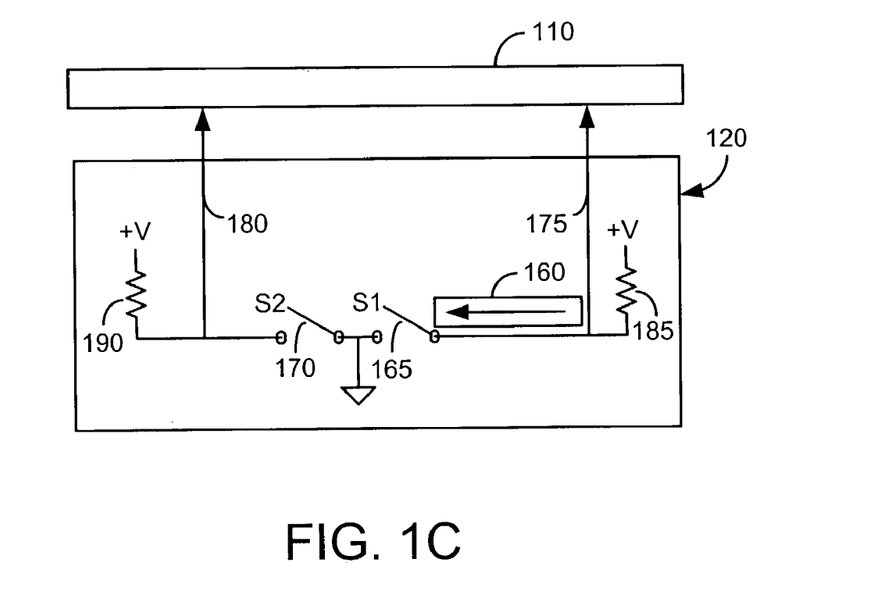
FIG. 1C is a circuit diagram of an input control in accordance with an illustrative embodiment of the invention.

FIG. 1C is a circuit diagram of input control 120 in accordance with an illustrative embodiment of the invention. In FIG. 1C, shutter release button 160 is capable of actuating, sequentially, switches S1 165 and S2 170. When shutter release button 160 is partially depressed, switch S1 165 is closed. When shutter release button 160 is further depressed, switch S2 170 is also closed. Prior to the closing of switches S1 165 and S2 170, signals 175 and 180, respectively, are both in a logic "high" state. Signals 175 and 180 are connected with data bus 110. The logic "high" state is provided by connection of the switches between a common ground and a positive voltage +V across pull-up resistors 185 and 190. When switch S1 165 is closed, the corresponding signal 175 is pulled down to ground potential, generating a logic "low." Likewise, when switch S2 170 is closed, the corresponding signal 180 is pulled down to ground potential, generating a logic "low."

Input control 120 may be used to trigger multiple operations in digital camera 100. For example, actuation of switch S1 165 may activate autofocus and autoexposure. Once autofocus and autoexposure adjustments are complete, a motion-tracking mode may be activated in which the motion of digital camera 100 is tracked. Actuation of S2 170 may signal a request that a digital image be captured and stored. In a prior-art digital camera, such capture would be immediate (without intentional delay). To minimize image blur caused by camera motion, however, it is advantageous to delay capture of the digital image until a moment when the motion of digital camera 100 is at an approximate local minimum. In other embodiments, input control 120 may include only one switch instead of two. In those embodiments, a single signal from input control 120 may request the capture of a digital image, and motion tracking may be activated by a separate input signal (e.g., the power of digital camera 100 being turned on) or by the same single signal from input control 120.

Measuring the motion of digital camera 100 may be implemented in a variety of ways. The most obvious is through the use of motion sensors, such as accelerometers or gyroscopes. In better keeping with the low cost and complexity objectives of the invention, motion can be measured using the image sensor itself. Motion estimation algorithms are well known in the video encoding art. Motion estimation generally involves comparing at least one picture element (pixel) in a first frame with at least one pixel in a second frame to discern a change in the scene during the interval between the two frames. This process may be repeated for successive pairs of frames to track camera motion relative to the background of the scene in approximately real time. In the context of the instant invention, motion estimation may be performed on digital preview frames obtained in the video preview mode of digital camera 100.

The comparison of pixels may also be implemented in a variety of ways. For example, the magnitude of the pixel-by-pixel difference in brightness (luminance) may be computed. Alternatively, a pixel-by-pixel correlation (multiplication) may be performed. If the pixels compared are in corresponding locations in the two digital preview frames, an indication may be obtained that motion of some sort between the frames occurred but not how much or in what direction. For this reason, motion estimation techniques typically also include a search algorithm in which one or more groups of pixels in a first digital preview frame are compared with groups of pixels within a predetermined search region surrounding each corresponding location in a second digital preview frame. A motion estimation algorithm typically computes a motion vector indicating the magnitude and direction of motion during a particular interval. This motion vector may be expressed conveniently as horizontal and vertical motion components.

Sophisticated motion estimation techniques used in connection with MPEG compression may improve the performance of motion estimation. Such improvements may include, for example, a fast search algorithm or an efficient computational scheme in addition to the general method described above. Such methods are well known in the video encoding art. One example of sophisticated MPEG motion estimation may be found in U.S. Pat. No. 6,480,629, the disclosure of which is incorporated herein by reference.

Figure 2A:
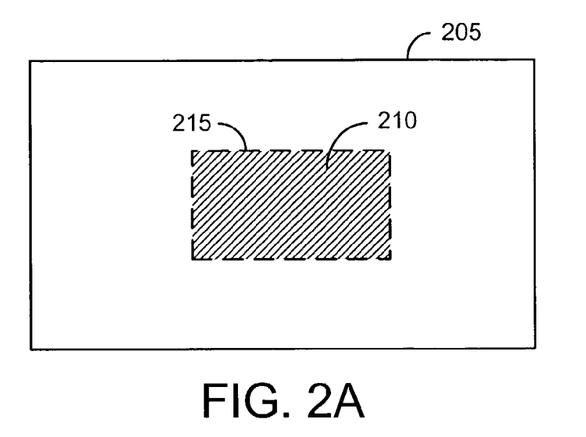
FIG. 2A is an illustration of a digital preview frame, of which a central portion is a motion measurement region, in accordance with an illustrative embodiment of the invention.

FIG. 2A depicts a digital preview frame 205 in accordance with an illustrative embodiment of the invention. Motion estimation may be performed using one or more pixels within motion measurement region 210 (cross-hatched in FIG. 2A). In FIG. 2A, motion measurement region 210 comprises a central portion of digital preview frame 205. Such a region may coincide with the region used in performing autofocus or autoexposure. In such an embodiment, motion estimation may share virtually the same video preview mode of digital camera 100 with autofocus and autoexposure. One disadvantage of this approach, however, is that a moving subject within the central portion of digital preview frame 205 may be detected instead of the motion of digital camera 100 relative to the background.

Figure 2B:
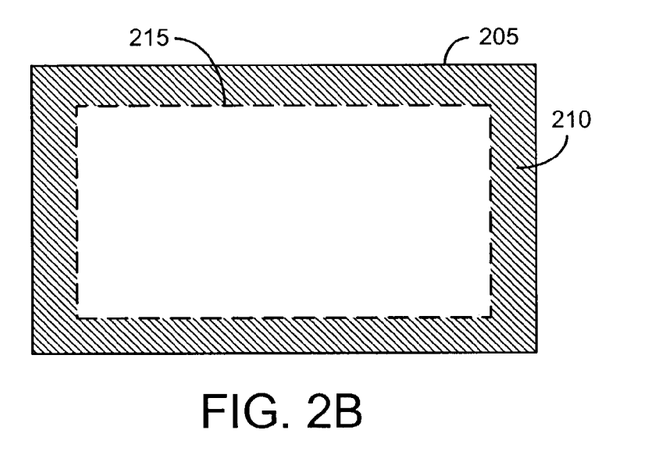
FIG. 2B is an illustration of a digital preview frame, of which a peripheral portion is a motion measurement region, in accordance with an illustrative embodiment of the invention

FIG. 2B shows one method for overcoming the problem of subject motion in accordance with an illustrative embodiment of the invention. In FIG. 2B, motion measurement region 210 comprises a peripheral portion of digital preview frame 205 where an important subject is less likely to be found. By confining motion estimation to the periphery, subject motion may be excluded, allowing the motion of digital camera 100 relative to the background of the scene to be measured.

In performing autofocus, digital cameras often apply a window function at the boundary of the autofocus region to minimize edge effects caused by contrasty image data at the boundary. The window function attenuates the edges of the autofocus region in a tapered fashion, resulting in a "soft" boundary. Such window functions are well known in the digital camera art. A window function applied at the boundary 215 delineating motion measurement region 210 may be advantageous for the same reason.

Figure 2C:
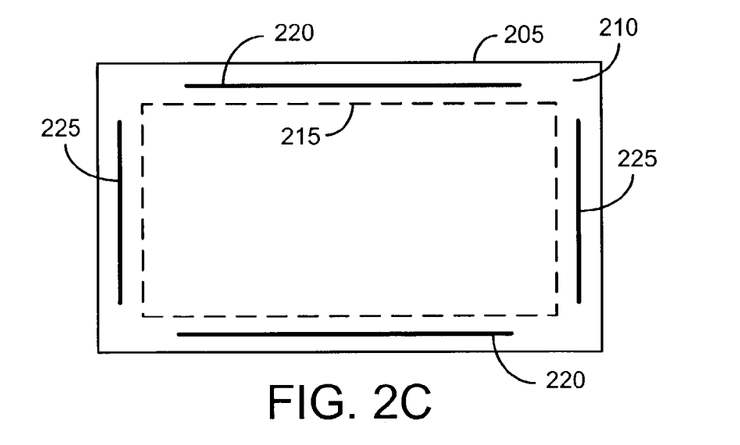
FIG. 2C is an illustration of separate horizontal and vertical sets of picture elements that may be used in measuring the motion of a digital camera in accordance with an illustrative embodiment of the invention.

FIG. 2C is an illustration of separate horizontal and vertical sets of pixels that may be used in performing motion estimation in accordance with an illustrative embodiment of the invention. In FIG. 2C, horizontal sets of pixels 220 and vertical sets of pixels 225, both lying within peripheral motion measurement region 210, may be used in performing motion estimation, as described above. Horizontal and vertical sets of pixels 220 and 225, respectively, may be single rows or columns of pixels or "strips" of pixels comprising multiple rows or columns. One advantage of this approach is that measurement of horizontal and vertical motion may be separated into two sets of computations (e.g., difference or correlation), each set of computations producing an estimated motion component. The limited number of pixels involved may also simplify the search algorithm. The choice of pixel sets shown in FIG. 2C is only one possibility of many. Fewer or more than the four sets of horizontal and vertical sets of pixels shown in FIG. 2C may be included in motion estimation.

Figure 3A:
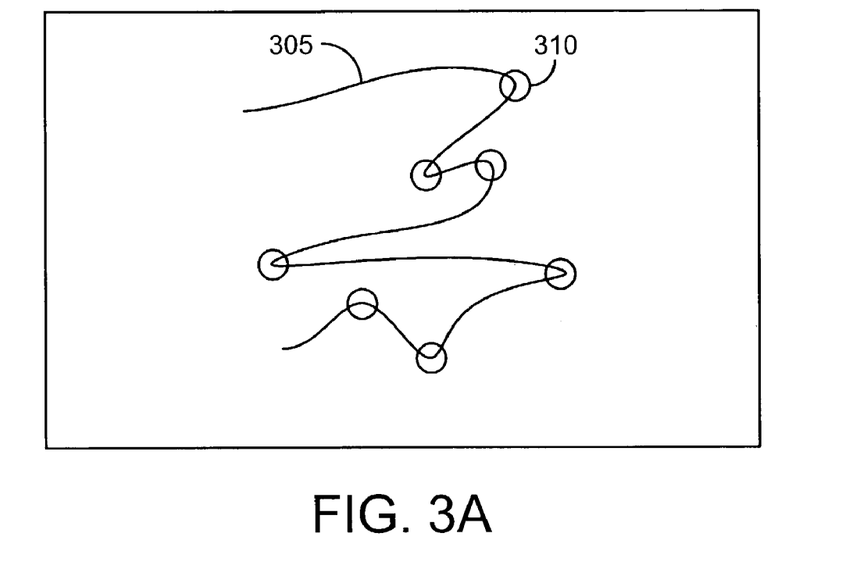
FIG. 3A is an illustration of a movement trajectory of a digital camera in accordance with an illustrative embodiment of the invention.

FIG. 3A is an illustration of a movement trajectory of a digital camera in accordance with an illustrative embodiment of the invention. Trajectory 305 in FIG. 3A depicts the path of movement made by digital camera 100 during an arbitrary period prior to an image being captured. Local minima 310, where the motion of digital camera 100 changes direction, are circled. Capturing a digital image at one of these local minima 310 may reduce image blur. Since the motion of digital camera 100 may not reach a local minimum in the horizontal direction at the same instance it reaches a local minimum in the vertical direction, this must be taken into account in designing criteria for image capture.

Many possible quantities may be chosen as the output of the motion tracking subsystem. If motion measurement logic 132 measures horizontal and vertical motion components (e.g., velocities), one possible choice is the square root of the sum of the horizontal motion component squared and the vertical motion component squared (magnitude of the motion vector). Another possible choice is the sum of the absolute value of the horizontal motion component and the absolute value of the vertical motion component.

Figure 3B:
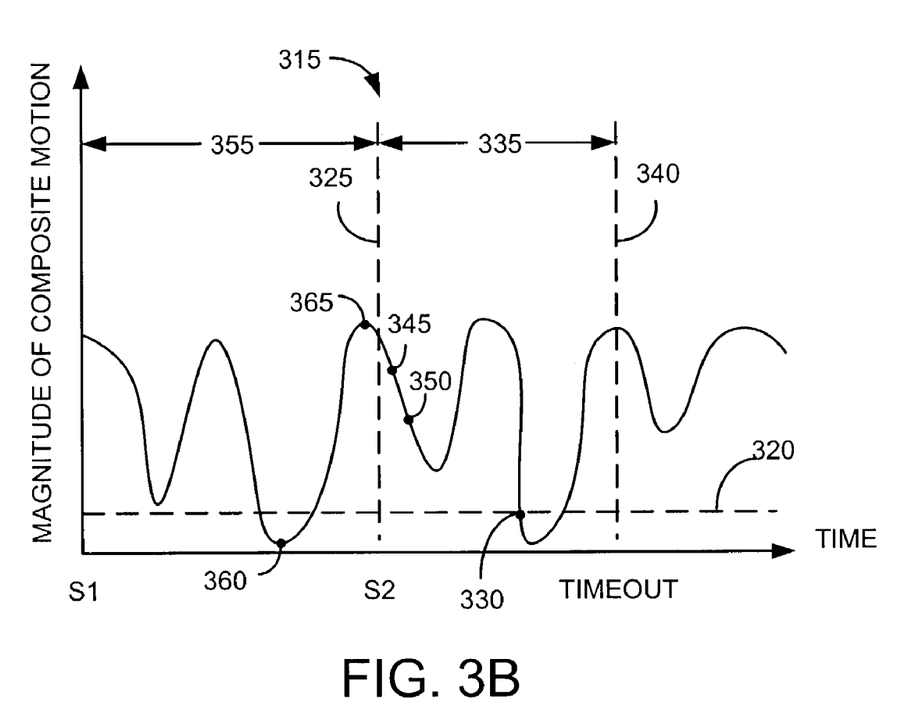
FIG. 3B is an illustrative plot of the magnitude of composite camera motion annotated with time and threshold parameters in accordance with an illustrative embodiment of the invention.

FIG. 3B is an illustrative plot 315 of the magnitude of composite motion of digital camera 100 annotated with time and threshold parameters in accordance with an illustrative embodiment of the invention. In plot 315, threshold 320 serves as a motion criterion for selecting the instant of image capture at an approximate local minimum. In one embodiment, a digital image is captured when the magnitude of motion drops below threshold 320 (point 330 in FIG. 3B) following activation of switch S2 170 at time 325. If the magnitude of motion does not drop below threshold 320 within a predetermined timeout period 335, the digital image may be captured at time 340. The choice of timeout period 335 may vary with application or situation, but it would likely not exceed 0.1 second. As an alternative to timeout period 335, the image may be captured, despite threshold 320 not being satisfied, if the motion of digital camera 100 is found to be decreasing (in terms of velocity, digital camera 100 is decelerating). An example of such an interval of decreasing motion is that from point 345 to point 350. Anticipating an approximate minimum in this way is particularly useful in accounting for readout and computational lags in the motion estimation process.

Threshold 320 may be selected based on any of a variety of factors or a combination thereof. In one embodiment, threshold 320 is selected based on the minimum and maximum motion measured (e.g., minimum and maximum velocities) during an interval 355 between actuation of switch S1 165 and actuation of switch S2 170 (see FIG. 3B). Such minimum and maximum motion measurements within interval 355 are illustrated by points 360 and 365, respectively. Threshold 320 may be chosen, for example, as a particular fraction of maximum 365 or as a value lying between minimum 360 and maximum 365. In a different embodiment, threshold 320 may be chosen based on the current focal length setting of optical system 155. A wide-angle focal length of optical system 155 is less sensitive to motion than a telephoto setting. Therefore, threshold 320 may need to be smaller for a telephoto focal length than for a wide-angle focal length. Likewise, a faster shutter speed also renders motion of digital camera 100 less critical. Consequently, threshold 320 may be larger (less strict) if digital camera 100 is operating at a fast shutter speed (e.g., 1/500 of a second) than if digital camera is operating at a slower shutter speed (e.g., 1/30 of a second). Another factor that may be used in selecting threshold 320 is interval 355 in FIG. 3B. For example, threshold 320 may be chosen differently depending on whether interval 355 is short or long. In yet another embodiment, the threshold can be set based on prior characterization of the typical amount of camera motion after actuation of S1 165. For example, if a high degree of motion is detected, due to an unsteady user, one-handed operation, etc., a higher threshold may be selected.

Optionally, threshold 320 may be altered after actuation of switch S2 170. For example, threshold 320 may be increased (making the motion criterion less strict) with the passage of time after the actuation of S2. This is yet another alternative to timeout period 335 and capturing the digital image upon detected deceleration of digital camera 100.

Figure 4:
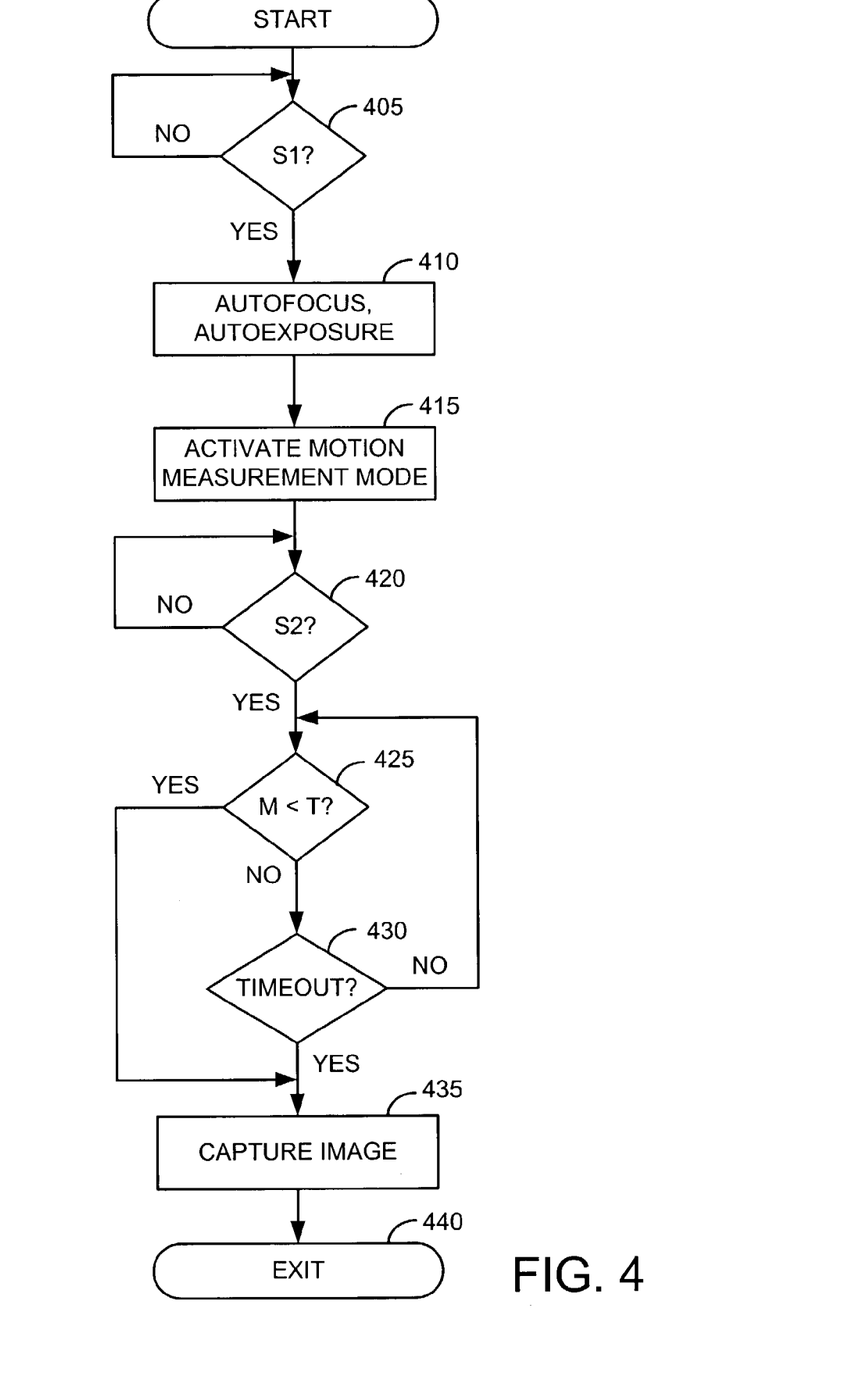
FIG. 4 is a flowchart of the operation of the digital camera shown in FIG. 1A in accordance with an illustrative embodiment of the invention.

FIG. 4 is a flowchart of the operation of digital camera 100 in accordance with an illustrative embodiment of the invention. If switch S1 165 is actuated at 405, autofocus and autoexposure are performed at 410. Once autofocus and autoexposure are complete, digital camera 100 enters a motion measurement mode at 415 in which the motion tracking subsystem measures the motion of digital camera 100 as a function of time, as explained above. If switch S2 170 is actuated at 420, control proceeds to 425, and timer 135 may be reset to count timeout period 335. At 425, the output of motion measurement logic 132 is compared with threshold 320. If the measured motion is less than threshold 320, a digital image may be captured immediately at 435. Otherwise, control proceeds to 430. At 430, controller 105 checks timer 135 to determine whether timeout period 335 has expired. If so, the digital image may be captured at 435. Otherwise, control returns to 425. Once the digital image has been captured, the process terminates at 440.

Figure 5:
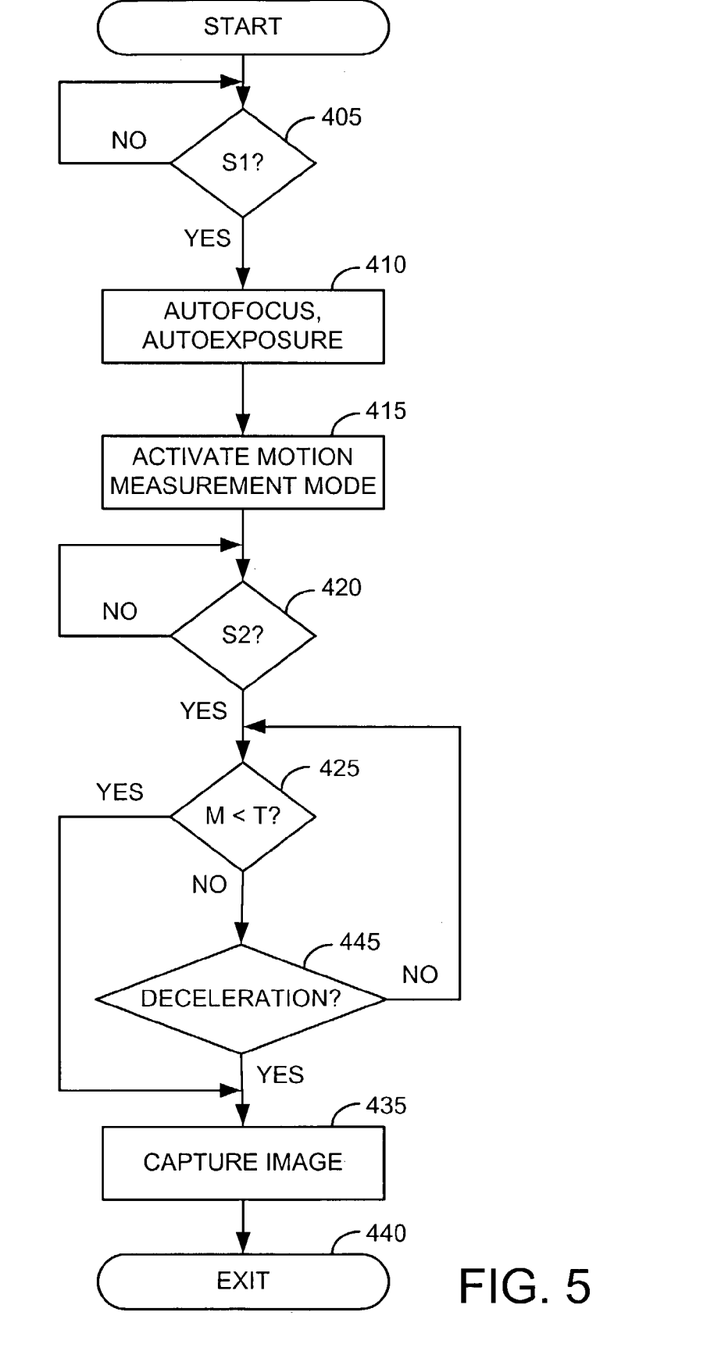
FIG. 5 is a flowchart of the operation of the digital camera shown in FIG. 1A in accordance with another illustrative embodiment of the, invention.

FIG. 5 is a flowchart of the operation of digital camera 100 in accordance with another illustrative embodiment of the invention. The process in FIG. 5 is similar to that in FIG. 4, except that a decrease (deceleration, in terms of velocity) in the motion of digital camera 100 is the criterion for capturing a digital image at 445, when threshold 320 is not satisfied at 425.

The foregoing description of the present invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital camera, comprising:
an input control to initiate capture of a digital image;
a motion tracking subsystem responsive to the input control to track motion of the digital camera. an output of the motion tracking subsystem indicating the quantity of motion of the digital camera as a function of time; and control logic configured to delay capture of the digital image until the outnut of the motion tracking subsystem satisfies a motion criterion, wherein the control logic is further configured to capture the digital image upon the expiration of a predetermined timeout period measured from an actuation of the input control, when the output of the motion tracking subsystem fails to satisfy the motion criterion within the predetermined timeout period;

wherein the motion criterion comprises the output of the motion tracking subsystem reaching an approximate local minimum being below a threshold;

wherein the input control comprises a pushbutton switch having at least a first position and a second position, the first position activating the motion tracking subsystem, the second position requesting capture of the digital image, and the control logic is configured to select the threshold, at least in part, based on an interval between an actuation of the input control to the first position and an actuation of the input control to the second position.

2. The digital camera of claim 1, wherein the control logic is configured to capture the digital image while the output of the motion tracking subsystem is decreasing, when the output of the motion tracking subsystem does not satisfy the motion criterion.

3. The digital camera of claim 1, wherein the input control comprises a pushbutton switch having at least a first position and a second position, the first position activating the motion tracking subsystem, the second position requesting capture of the digital image.

4. The digital camera of claim 1, wherein the control logic is configured to select as the threshold a value lying between a minimum and a maximum of the output of the motion tracking subsystem.

5. The digital camera of claim 1, wherein the control logic is configured to select the threshold, at least in part, based on a current focal length of a lens of the digital camera.

6. The digital camera of claim 1, wherein the control logic is configured to select the threshold, at least in part, based on a current shutter speed setting of the digital camera.

7. The digital camera of claim 1, wherein the control logic is further configured to increase the threshold with the passage of time after the actuation of the input control to the second position.

8. The digital camera of claim 1, wherein the control logic is configured to select the threshold, at least in part, based on prior measurements of the motion of the digital camera.

9. A method for reducing image blur in a digital camera, comprising:

tracking motion of the digital camera in response to a first input signal; and delaying capture of a digital image, following receipt of a second input signal, until the motion of the digital camera satisfies a motion criterion, wherein the first and second input signals are one and the same input signal;

wherein the motion criterion comprises the motion of the digital camera reaching an approximate local minimum being below a threshold, wherein the threshold is selected to be a value lying between a minimum and a maximum motion of the digital camera measured during an interval between receipt of the first input signal and receipt of the second input signal.

10. The method of claim 9, further comprising:

capturing the digital image upon the expiration of a predetermined timeout period measured from receipt of the second input signal, when the motion of the digital camera does not satisfy the motion criterion within the predetermined timeout period.

11. The method of claim 9, further comprising;

capturing the digital image while the digital camera is decelerating, when the motion of the digital camera does not satisfy the motion criterion.

12. The method of claim 9, wherein the threshold is selected, at least in part, based on a current focal length of a lens of the digital camera.

13. The method of claim 9, wherein the threshold is selected, at least in part, based on a current shutter speed selling of the digital camera.

14. The method of claim 9, wherein the threshold is selected, at least in part, based on an interval between receipt of the first input signal and receipt of the second input signal.

15. The method of claim 9, wherein the threshold is increased with the passage of time following receipt of the second input signal.

16. The method of claim 9, wherein the threshold is selected, at least in part, based on prior measurements of the motion of the digital camera.

* * * * *

UNITED STATES PATENT AND TRADEMARK OFFICE
CERTIFICATE OF CORRECTION

PATENT NO. : 7,212,230 B2 Page 1 of 1
APPLICATION NO. : 10/339132
DATED : May 1, 2007
INVENTOR(S) : Donald J. Stavely It is certified that error appears in the above-identified patent and that said Letters Patent is hereby corrected as shown below:

In column 1, line 10, after "a" insert -- digital --.

In column 6, line 67, in Claim 1, after "camera" delete "." and insert -- , --, therefor.

In column 7, line 5, in Claim 1, delete "outnut" and insert -- output --, therefor.

In column 8, line 26, in Claim 11, after "comprising" delete ";" and insert -- : --, therefor.

In column 8, line 36, in Claim 13, delete "selling" and insert -- setting --, therefor.

Signed and Sealed this

Twelfth Day of May, 2009

JOHN DOLL
*Acting Director of the United States Patent and Trademark Office*